United States Patent
Cabral et al.

(10) Patent No.: US 6,937,961 B2
(45) Date of Patent: Aug. 30, 2005

(54) PERFORMANCE MONITOR AND METHOD THEREFOR

(75) Inventors: Carlos J. Cabral, Austin, TX (US); Jose M. Nunez, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 91 days.

(21) Appl. No.: 10/255,427

(22) Filed: Sep. 26, 2002

(65) Prior Publication Data

US 2004/0064290 A1 Apr. 1, 2004

(51) Int. Cl.$^7$ .............................................. G06F 15/00
(52) U.S. Cl. ..................................... 702/182; 709/226
(58) Field of Search ................ 711/111–113, 166–169, 711/202; 709/223, 226, 236, 238; 702/61, 62, 178, 182, 186, 193, 59, 68, 75, 78, 79, 81, 90, 120, 125, 128, 177, 183, 184, 189

(56) References Cited

U.S. PATENT DOCUMENTS

| | | | |
|---|---|---|---|
| 4,872,121 A | * 10/1989 | Chan et al. | 702/182 |
| 5,274,625 A | 12/1993 | Derby et al. | |
| 5,937,437 A | * 8/1999 | Roth et al. | 711/202 |
| 5,991,708 A | * 11/1999 | Levine et al. | 702/186 |
| 6,026,139 A | 2/2000 | Hady et al. | |
| 2003/0204595 A1 | * 10/2003 | Lev et al. | 709/226 |

FOREIGN PATENT DOCUMENTS

EP     0 897 152 A2     2/1999

OTHER PUBLICATIONS

Edition 2.8 GNU Emacs Lisp Reference Manual Edition 2.8; 16pp.

* cited by examiner

Primary Examiner—Marc S. Hoff
Assistant Examiner—Mohamed Charioui
(74) Attorney, Agent, or Firm—Joanna G. Chiu; David G. Dolezal

(57) ABSTRACT

Embodiments of the present invention relate generally to a monitoring unit and method which counts a number of qualified clusters of a selected event type based on a size threshold, granularity threshold, and distance threshold time. In one embodiment, a qualified cluster is a cluster which meets both the size threshold and granularity threshold. In one embodiment, a qualified cluster is detected and counted by the cluster counter if it occurs at least the distance threshold time after a previous counted qualified cluster. For example, in one implementation, the performance monitor waits until a distance threshold time expires prior to detecting a next qualified cluster. Alternatively, all qualified clusters are detected where the cluster counter counts a qualified cluster only if it occurs at least the distance threshold time after a previous qualified cluster, regardless of whether it was counted by the cluster counter or not.

22 Claims, 5 Drawing Sheets

PERFORMANCE MONITOR AND METHOD THEREFOR

FIELD OF THE INVENTION

The present invention relates to performance monitors, and more specifically, to monitoring cluster of events.

RELATED ART

Performance monitoring is generally used to characterize operation of data processing systems. For example, particular events within a data processing system (such as memory accesses) can be identified and monitored in order to characterize performance. One known performance monitor is capable of monitoring events such as memory accesses and characterizing the clustering of these events based on a cluster size and a cluster granularity. In this solution, the cluster size specifies the minimum number of event occurrences that constitute a cluster, and the cluster granularity specifies the maximum allowable number of cycles between individual event occurrences for them to be considered part of a cluster. Therefore, the performance monitor can characterize operation of the data processing system with respect to the clustering of memory accesses. However, using only cluster size and granularity to characterize the clustering of events leads to a mischaracterization of the event clustering because it is difficult to quantify distribution of these event occurrences. Therefore, a need exists for improved event profiling in order to achieve better characterization and, likewise, a better understanding of a data processing system's behavior.

BRIEF DESCRIPTION OF THE DRAWINGS

The present invention is illustrated by way of example and not limited by the accompanying figures, in which like references indicate similar elements, and in which.

Figure 1:
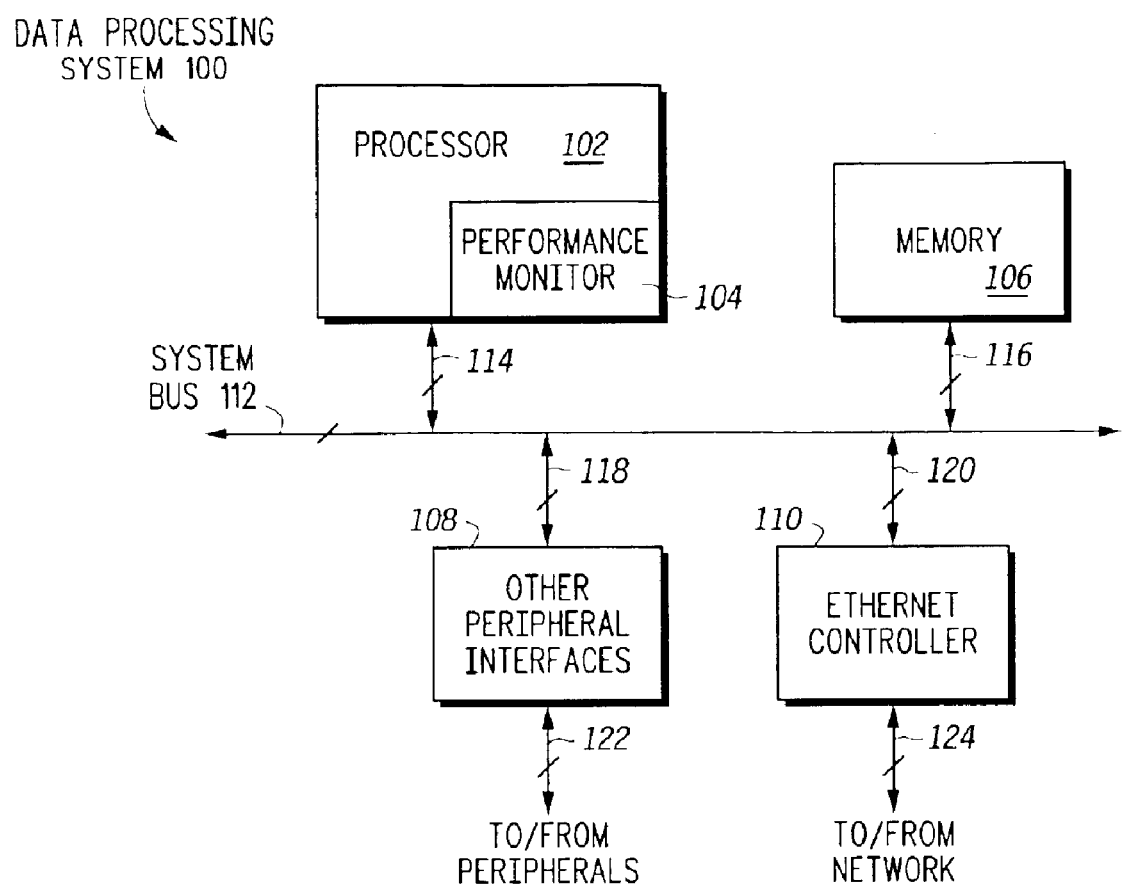
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" and "negate"(or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Also, as used herein, an expired counter or a counter that has expired indicates a counter that has reached zero.

The characterization of event clustering allows for the ability to profile the behavior of a data processing system or any type of electronic system. This characterization may be used for understanding the behavior of accesses to memory or any device in which accesses are spread out over time with a non-uniform distance between clusters of accesses. This characterization can be used to determine the maximum bandwidth demand of a given interface, the duration of this peak bandwidth requirement, and the distance between these peaks. The results may be used by software programmers to tune their software and change the characteristics of these peaks to increase the overall performance of the system. Another use of the information obtained through this characterization is to give the hardware designer an idea of the maximum system bandwidth demand and the distribution of these peak demands. The hardware designer can use the information to make design trade-off decisions and handle this demand in an optimal manner.

Note that an event can refer to any event within a data processing system or electronic system. Generally, an event is any activity that can be detected such as, for example, by the assertion or deassertion of a logic signal. For example, in one embodiment, events include memory accesses (i.e. read requests and write requests), frames received from an Ethernet controller via an Ethernet interface, peripheral device accesses, indications of valid data on a communications bus, or any type of bus transactions. Alternatively, any other type of events may be defined.

FIG. 1 illustrates, in block diagram form, a data processing system 100 having a processor 102, a memory 106, other peripheral interfaces 108, an Ethernet controller 110 and a system bus 112. Processor 102 includes a performance monitor 104 and is coupled to system bus 112 via bidirectional conductors 114. Memory 106 is coupled to system bus 112 via bidirectional conductors 116, Ethernet controller is coupled to system bus 112 via bidirectional conductors 120, and other peripheral interfaces 108 are coupled to system bus 112 via bidirectional conductors 118. Other peripheral interfaces 108 are coupled to other peripherals via bidirectional conductors 122, and Ethernet controller 110 is coupled to a communications network via bidirectional conductors 124. In one embodiment data processing system 100 is a microprocessor, microcontroller, digital signal processor, or the like, as known in the art. Memory 106 may be any type of memory including volatile or nonvolatile memories, such as, for example, a random access memory (RAM), static RAM (SRAM), dynamic RAM (DRAM), read only memory (ROM), flash, electrically erasable and programmable ROM (EEPROM), erasable and programmable ROM (EPROM), etc. Ethernet controller 110 is one type of peripheral that may be located within data processing system 100; however, data processing system 100 may also include other peripheral interfaces 108 which interface to peripherals such as, for example, input/output (I/O) devices, a universal asynchronous receiver transmitter (UART), a real time clock (RTC), etc. Other peripheral interfaces 108 may also include interfaces such as a PCI (Peripheral Component Interface) interface and RapidIO interface. Also, data processing system 100 may include any number of memories coupled to system bus 112 and any number of peripherals in addition to or in place of those illustrated in FIG. 1.

In one embodiment, all of data processing system 100 is integrated on a single chip, such as for example, in an SoC (system on chip) solution. However, in alternate embodiments, portions of data processing system 100 may be on separate integrated circuits located in different chips, such as, for example, within a chip set. For example, memory 106 may be located on a separate integrated circuit from processor 102. Also, performance monitor 104 may be integrated within processor 102 (as illustrated in FIG. 1) or may be located outside processor 102 on a separate integrated circuit. In one embodiment, performance monitor 104 may be a stand alone Application Specific Integrated Circuit (ASIC) or may be located in an electronic system, such as, for example, a logic analyzer, separate from data processing system 100. In operation, processor 102 is able to process instructions received from memory 106 or from other peripheral devices and is able to transfer data to and from memory 106, other peripheral devices, and Ethernet controller 110, as known in the art.

Figure 2:
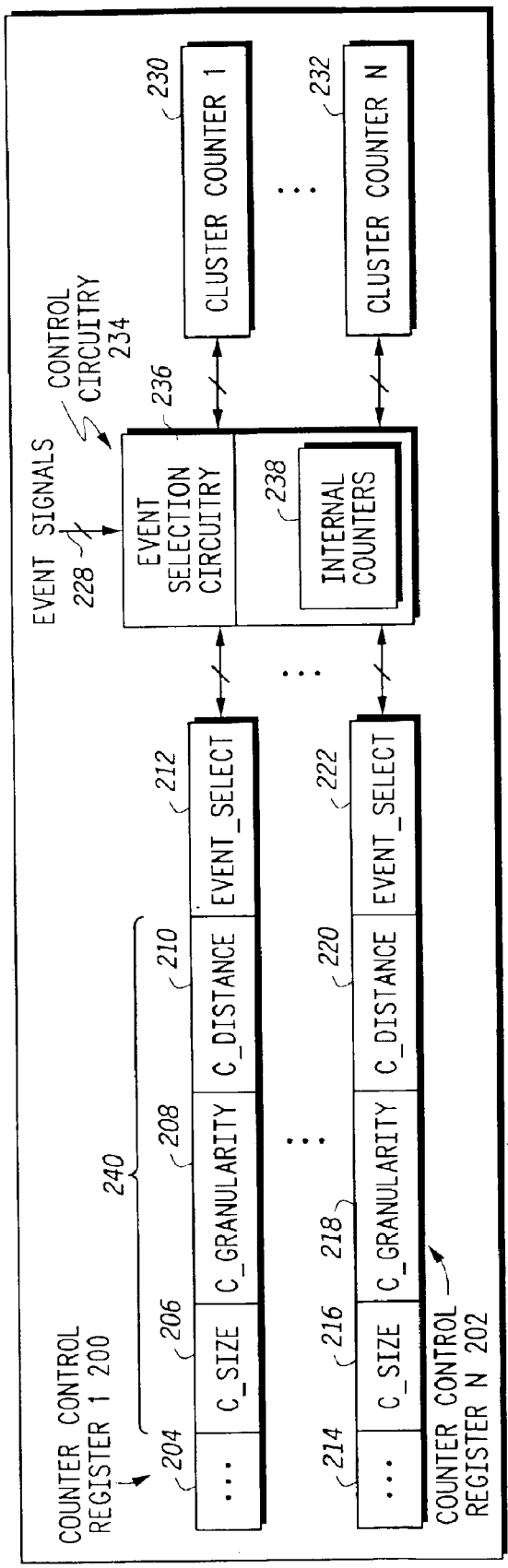
FIG. 2 illustrates, in block diagram form, a performance monitor of the data processing system of FIG. 1 in accordance with one embodiment of the present invention.

FIG. 2 illustrates one embodiment of performance monitor 104 of FIG. 1. (Note that performance monitor 104 may also be referred to as a monitoring unit.) Performance monitor 104 includes counter control register 1 200 through counter control register N 202, control circuitry 234, and cluster counter 1 230 through cluster counter N 232. Counter control register 1 200, counter control register N 202, cluster counter 1 230, and cluster counter N 232 are each bidirectionally coupled to control circuitry 234. Counter control register 1 200 includes a cluster size threshold field (c_size 206), a cluster granularity threshold field (c_granularity 208), a cluster distance threshold time field (c_distance 210), an event selection field (event_select 212), and other fields 204. Similarly, counter control register N 202 includes a cluster size threshold field (c_size 216), a cluster granularity threshold field (c_granularity 218), a cluster distance threshold time field (c_distance 220), an event selection field (event_select 222), and other fields 214. Control circuitry 234 includes event selection circuitry 236 and internal counters 238, and receives event signals 229 from various portions of processor 102. Note that performance monitor 104 can therefore include N counter control registers and N cluster counters, as needed, where N can be any number. Note also that the control registers of performance monitor 104 can be organized in a variety of different ways. For example, in one embodiment, separate control registers may be used for clustering options, or the counter control registers may be combined into larger registers having a different number of fields, as needed.

In operation, performance monitor includes an event counter corresponding to each counter control register. For example, cluster counter 1 230 is an event counter that corresponds to counter control register 1 200. The field event_select 212 is used to identify which type of event is to be monitored. For example, event_select 212 can be set such that memory accesses (reads or writes or both that occur, for example, over system bus 112 between processor 102 or any other peripheral and memory 106) are monitored or frames received via an Ethernet interface are monitored, etc. Therefore, event_select 212 can be set to identify one event type while event_select 222 can be selected to identify the same or another event type. Assuming event clustering is not enabled for counter control register 1 200 (c_size 206 is set to zero), cluster counter 1 230 operates as an event counter which simply counts the number of events of the type indicated by event_select 212, where other fields 204 may be used to further define options. For example, event signals 228 may include logic signals indicating when memory writes are occurring and memory reads are occurring. Event_select 212 may be set to select the monitoring of memory writes only by cluster counter 1 230 (which is operating as an event counter). Event selection circuitry 236 therefore uses event_select 212 to select the appropriate incoming event signal of event signals 228 which indicate the occurrence of memory writes, and upon receiving an assertion of the appropriate incoming event signal, the corresponding event counter (cluster counter 1 230) is incremented.

In the case where event clustering is enabled (c_size 206 is not zero), cluster counter 1 230 operates to count clusters of a selected event type (selected by event_select 212) which meet the thresholds set by c_size 206, c_granularity 208, and c_distance 210. Therefore, the fields c_size 206, c_granularity 208, and c_distance 210 are used when event clustering is enabled such that cluster counter 1 230 no longer counts occurrences of single events of the selected event type but counts occurrences of clusters of a selected event type. (Note that cluster control register N 202 and cluster counter N 232 operate analogously to cluster control register 1 200 and cluster counter 1 230.) In the embodiment discussed herein, c_size 206 and c_granularity 208 define qualified clusters. That is, a qualified cluster (as will be described further in reference to FIG. 3) is one that meets both the size and granularity thresholds set by c_size 206 and c_granularity 208, respectively. The size threshold specifies the minimum number of event occurrences that constitute a cluster of events. Generally, a cluster is defined as a grouping of a same type of event; however, alternatively, a cluster may refer to a grouping of more than one type of event. The granularity threshold specifies the maximum allowable number of time or cycles (e.g. clock cycles) between individual event occurrences for the event occurrences to be considered part of a same cluster.

The distance threshold time set by c_distance 210 is used to determine which qualified clusters are to be counted by cluster counter 1 230. The distance threshold time specifies the acceptable number of time or cycles (e.g. clock cycles) between a predetermined point of a previous qualified cluster to a predetermined point of a subsequent qualified cluster in order for the subsequent qualified cluster to be counted as an individual cluster by cluster counter 1 230. For example, in one embodiment, the distance threshold time may specify the minimum acceptable number of time or cycles between the end of a previous qualified cluster and the beginning of a subsequent qualified cluster. In an alternate embodiment, the distance threshold time may specify the minimum acceptable number of time or cycles between an end of a previous qualified cluster and a point at which a c_size number of event occurrences has already been detected within the subsequent qualified cluster. Alternatively, the distance threshold time can specify the minimum acceptable number of time or cycles between a starting point or ending of a previous cluster and a starting point or ending point of a subsequent cluster. Alternatively, the distance threshold time may specify the minimum acceptable number of time or cycles between a point at which a c_size number of event occurrences has already been detected within the previous qualified cluster and a point at which a c_size number of event occurrences has already been detected within the subsequent qualified cluster. In yet another embodiment, the distance threshold time specifies the minimum acceptable number of time or cycles between a predetermined point of a previous qualified cluster which was counted and a predetermined point of a subsequent qualified cluster. Therefore, the distance threshold time can be defined in a variety of different ways.

Figure 4:
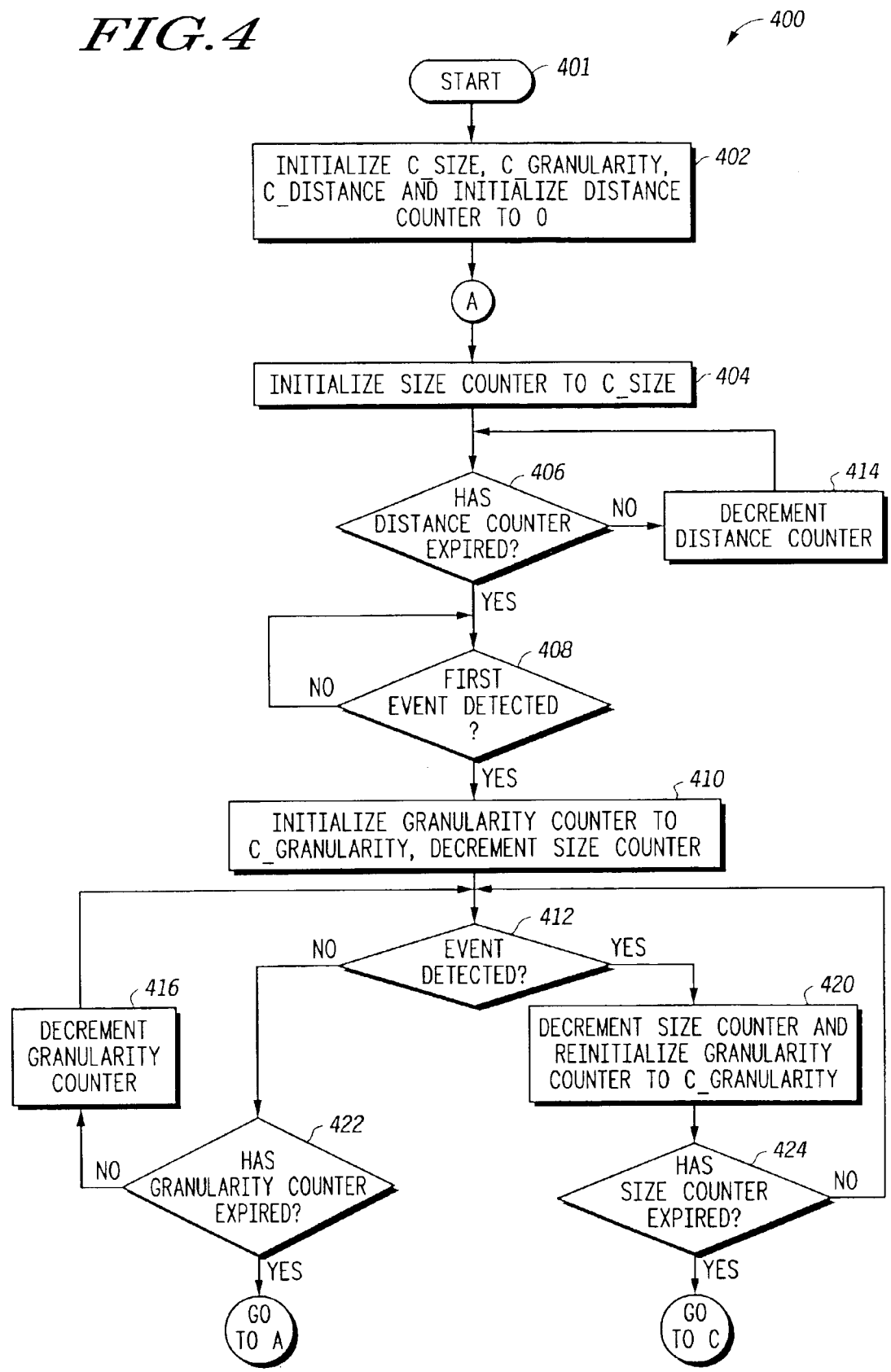
FIGS. 4 and 5 illustrate operation of the performance monitor of FIG. 2 in accordance with one embodiment of the present invention.
Figure 5:
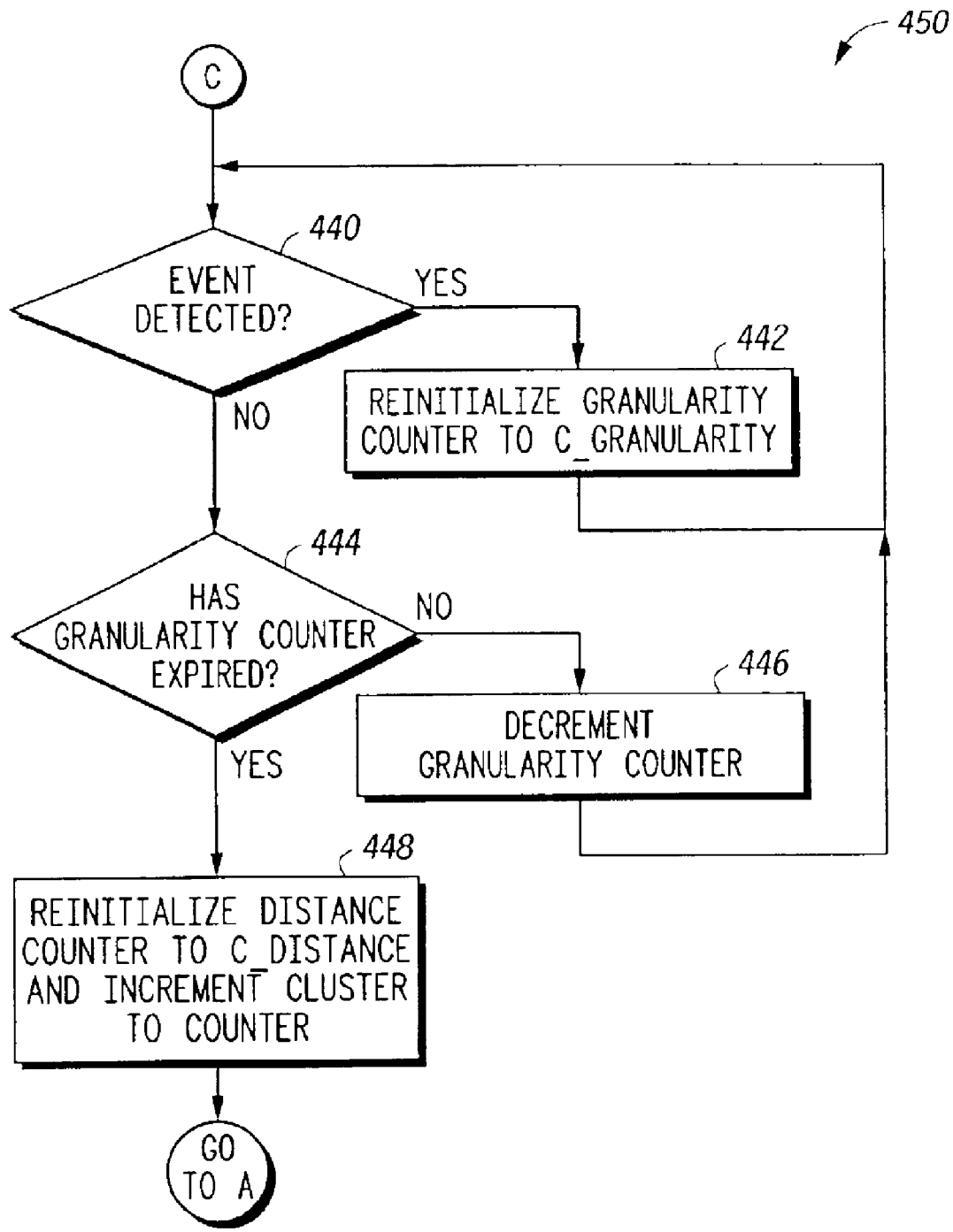

Referring back to FIG. 2, if c_size 206 has a value greater than zero, then clustering is enabled such that cluster counter 1 230 counts the number of qualified clusters of an event type (selected by event_select 212) which meets c_size 206, c_granularity 208, and c_distance 210. That is, as described above, event selection circuitry 236 selects which of the event signals 228 to monitor depending on event_select 212 such that cluster counter 1 230 counts clusters of the selected event type. Similarly, if clustering is also enabled in counter control register N 202 (with c_size 216 being greater than zero), then event selection circuitry 236 selects which of the event signals 228 to monitor depending on event_select 222 such that cluster counter N 232 counts clusters of the selected event type. Internal counters 238, as will be described in more detail in reference to the flow diagrams of FIGS. 4 and 5, are used to determine whether the thresholds set by c_size 206, c_granularity 208, and c_distance are met. (Note that the descriptions provided herein in reference to counter control register 1 200 and cluster counter 1 230 also apply to counter control register N 202 and cluster counter N 232.)

Figure 3:
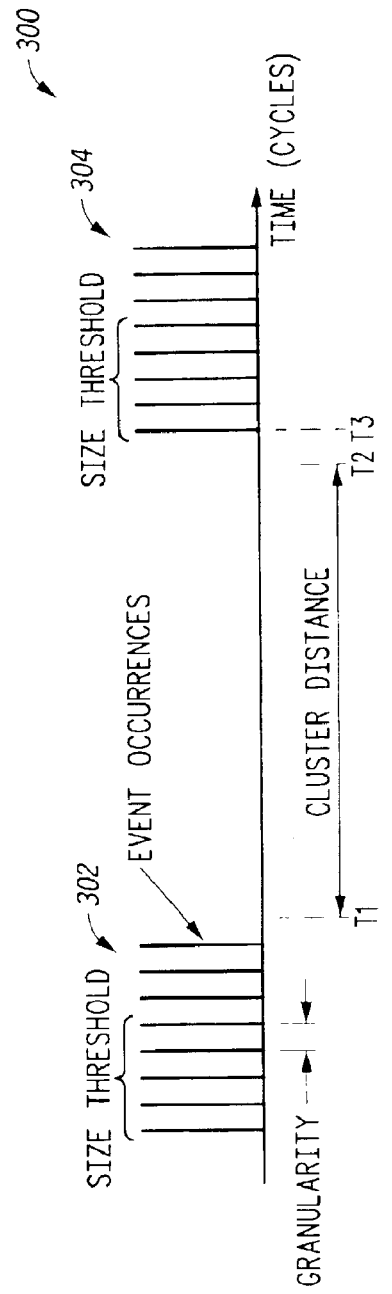
FIG. 3 illustrates an example of event clustering in accordance with one embodiment of the present invention.

FIG. 3 illustrates an example 300 of event clustering which helps in the understanding of the size threshold, granularity threshold, and the distance threshold time. FIG. 3 illustrates two clusters 302 and 304. Referring to cluster 302, a number of event occurrences is illustrated. Since the number of event occurrences meets the size threshold requirement (which, in this example, is 5), and the distance between any two events within cluster 302 is less than (or equal to) the granularity threshold (c_granularity), cluster 302 is considered a qualified cluster. For the same reasons as explained for qualified cluster 302, cluster 304 is also a qualified cluster since it includes a number of event occurrences greater than (or equal to) the size threshold and the distance between any two events is less than (or equal to) the granularity threshold. In example 300 of FIG. 3, the cluster distance (i.e. the amount of time or clock cycles between two clusters) is defined from the end of the previous qualified cluster 302 indicated by T1 to the beginning of the subsequent qualified cluster 304 indicated by T3. T2, in example 300, indicates the time at which the threshold distance time (c_distance) expires. That is, the time between T1 and T2 indicates the threshold distance time (c_distance). Therefore, since the cluster distance is greater than c_distance, qualified cluster 304 is counted by a cluster counter. However, if the cluster distance between qualified clusters 304 and 302 had not met the distance threshold time, then qualified cluster 304 would not be counted. That is, if T3 had occurred prior to T2, such that the number of event occurrences after T2 did not meet the threshold distance requirement, then qualified cluster 304 would not be counted. Therefore, in the illustrated embodiment, after the occurrence of a first qualified cluster, performance monitor 104 waits for a threshold distance time to expire before detecting a next qualified cluster, as will be described in more detail in reference to FIGS. 4 and 5 below. That is, in the illustrated embodiment, after each qualified cluster is counted, a threshold distance time should expire prior to counting a subsequent qualified cluster.

FIGS. 4 and 5 illustrate, in flow diagram form, a method for counting qualified clusters which may be used by performance monitor 104 in accordance with one embodiment of the present invention. Flow 400 of FIG. 4 illustrates a method of detecting a qualified cluster, in accordance with one embodiment of the present invention. How 400 begins with start 401 and proceeds to block 402 where c_size, c_granularity and c_distance are initialized. (Note that in the descriptions herein of FIGS. 4 and 5 c_size, c_granularity, c_distance, and cluster counter can refer to any one of cluster control registers 1 200 to N 202 and corresponding cluster counters 1 230 to N 232.) In one embodiment, cluster control registers are user programmable such that a user can program the desired values for c_size, c_granularity, and c_distance. In this manner, a user can profile data processing system 100 using different threshold values. Alternatively, they may be hardwired into data processing system 100. Also in block 402, a distance counter (one of internal counters 238 of performance monitor 104) is initialized to zero. Flow then proceeds, via point A, to block 404 where a size counter (another one of internal counters 238 of performance monitor 104) is initialized to the value of c_size. Flow then proceeds to decision diamond 406.

At decision diamond 406, it is determined whether the distance counter has expired. If not, flow proceeds to block 414 where the distance counter is decremented if it does not already equal zero, and flow then returns to decision diamond 406. Therefore, flow does not proceed from decision diamond 406 to decision diamond 408 (which begins the search for a first event occurrence) until the distance counter has expired. Any events which occur prior to the distance counter expiring are therefore not used in detecting a qualified cluster. If, however, the distance counter has expired at decision diamond 406, flow proceeds to decision diamond 408.

At decision diamond 408, it is determined whether a first event is detected. If not, flow returns to decision diamond 408. That is, since the distance counter has already expired, flow 400 remains at decision diamond 408 until a first event is detected. Once a first event is detected, flow proceeds to block 410. The first event detected in decision diamond 408 is an event which is possible of being a first event in a qualified cluster. That is, the process for identifying a qualified cluster does not begin until after the distance counter has expired and a first event is detected. This first event, for example, can be the first event detected upon starting up performance monitor 104. This first event can also be the first event detected after the end of a previous qualified cluster, or after a previous event which occurred a certain amount of time greater than that allowed by the granularity threshold before the detected first event. This first event can also refer to an event which occurs during a cluster or qualified cluster, if, for example, the distance counter expires during the occurrence of the cluster or qualified cluster. In block 410, since the possible beginning of a qualified cluster was detected by detecting the first event, the granularity counter (another one of internal counters 238 of performance monitor 104) is initialized to c_granularity. Also, since a first event was detected, the size counter is decremented.

Flow then proceeds to decision diamond 412 where it is determined whether a next event is detected (e.g. to determine whether, at the next clock in data processing system 100, an event is detected). If not, flow proceeds to decision diamond 422 where it is determined if the granularity counter has expired. If so, flow returns to point A such that a new first event can be detected because if the granularity counter did expire, the time between the first event and the current time (e.g. the current clock cycle at which no event was detected) is greater than the granularity threshold, and thus the first event cannot be the beginning of a qualified cluster. Therefore, at point A, the search for a new first event begins. (Note that upon proceeding to point A, the distance counter is already expired, and thus flow proceeds directly down to decision diamond 408 to search for a new first event.) However, if at decision diamond 422 the granularity counter has not expired, flow proceeds to block 416 where the granularity counter is decremented and then back to decision diamond 412.

If, at decision diamond 412 an event is detected flow proceeds to block 420. An event detected at decision diamond 412 indicates that the time between the first event (or a previous event) and the current event is within the granularity threshold. Therefore, at block 420, the size counter is decremented to indicate that another event which may be part of a qualified cluster has been detected. Since another event has been detected, the granularity counter is also reinitialized in block 420, and flow proceeds to decision diamond 424. At decision diamond 424, it is determined whether the size counter has expired. If the size counter has not yet expired, then the size threshold has not yet been met and flow returns to decision diamond 412 where it is determined whether another event is detected at the next clock. If no event is detected within c_granularity number of clocks, flow will return to block 404 from decision diamond 422 via point A, as was described above. However, if a next event is detected prior to the granularity counter expiring, then flow will again return to decision diamond 424 via block 420.

If, at decision diamond 424, the size counter has expired, then a c_size number of events meeting the granularity threshold has been detected, thus indicating the detection of a qualified cluster. That is, the time between any two adjacent events of those c_size number of events that were detected is at most the granularity threshold. Furthermore, the detection of the qualified cluster was either the first detected qualified cluster upon starting up performance monitor 104 or a qualified cluster which occurred at least a c_distance after a previously detected qualified cluster, due to the loop defined by decision diamond 406 and block 414 which waits for the distance counter to expire. Since the size threshold, granularity threshold, and the distance threshold time are met, a qualified cluster is indicated and flow proceeds to point C of FIG. 5. (Note that in the current embodiment, the detected qualified cluster may actually be a portion of a larger cluster or qualified cluster, since the "first event" detected at decision diamond 408 can occur during the occurrence of a cluster or qualified cluster.)

FIG. 5 illustrates a flow 450 which begins with point C, where point C indicates that a qualified cluster has been detected. However, in the illustrated embodiment, the cluster counter is not incremented until the end of the current qualified cluster is detected. (Note that in alternate embodiments, the cluster counter can be incremented prior to the end of the qualified cluster.) Therefore, flow proceeds to decision diamond 440 via point C in order to eventually detect the end of the current qualified cluster.

At decision diamond 440 it is determined whether an event is detected (at the next clock). If so, flow proceeds to block 442 where the granularity counter is reinitialized to c_granularity because the detection of a new event should reset the granularity counter. Flow then returns to decision diamond 440. If, at decision diamond 440, no event is detected at the next clock, flow proceeds to decision diamond 444 where it is determined whether the granularity counter has expired. If not, then flow proceeds to block 446 where the granularity counter is decremented, and flow then proceeds to decision diamond 440 to determine if an event is detected at the next clock. Therefore, flow continuously returns to decision diamond 440 so long as an event is detected or the granularity counter has not expired. If, at decision diamond 444, the granularity counter has expired, then any subsequent event would exceed the granularity threshold and could no longer be considered a part of the current qualified cluster. Therefore, when the granularity counter has expired at decision diamond 444, flow proceeds to block 448 which indicates that the current qualified cluster has ended and should therefore be counted. In block 448, the cluster counter is incremented and the distance counter is reinitialized to c_distance. Flow then proceeds to block 404 of FIG. 4 via point A where, after waiting for the distance threshold time to occur (i.e. for the distance counter to expired) the search for a new first event (i.e. a next qualified cluster) commences.

Note that in the illustrated embodiment, the distance counter is reinitialized to c_distance after a current qualified cluster is counted (at block 448). In the illustrated embodiment, the cluster counter is therefore incremented each time the size counter, granularity counter, and distance counter is zero, and no event is occurring at that clock.

The methods of FIGS. 4 and 5 can be implemented in software, hardware, firmware, or any combination thereof. For example, in one embodiment, control circuitry 234 of FIG. 2 includes the internal counters and any logic required to properly increment, decrement, and reset internal counters 238 and cluster counters 1 to N. Control circuitry 234 may also include any logic necessary to read from and write to counter control registers 1 to N. Also, different embodiments may implement the internal counters differently. For example, rather than counting down to zero, alternate embodiment may increment a counter until a threshold value is met.

Figure 6:
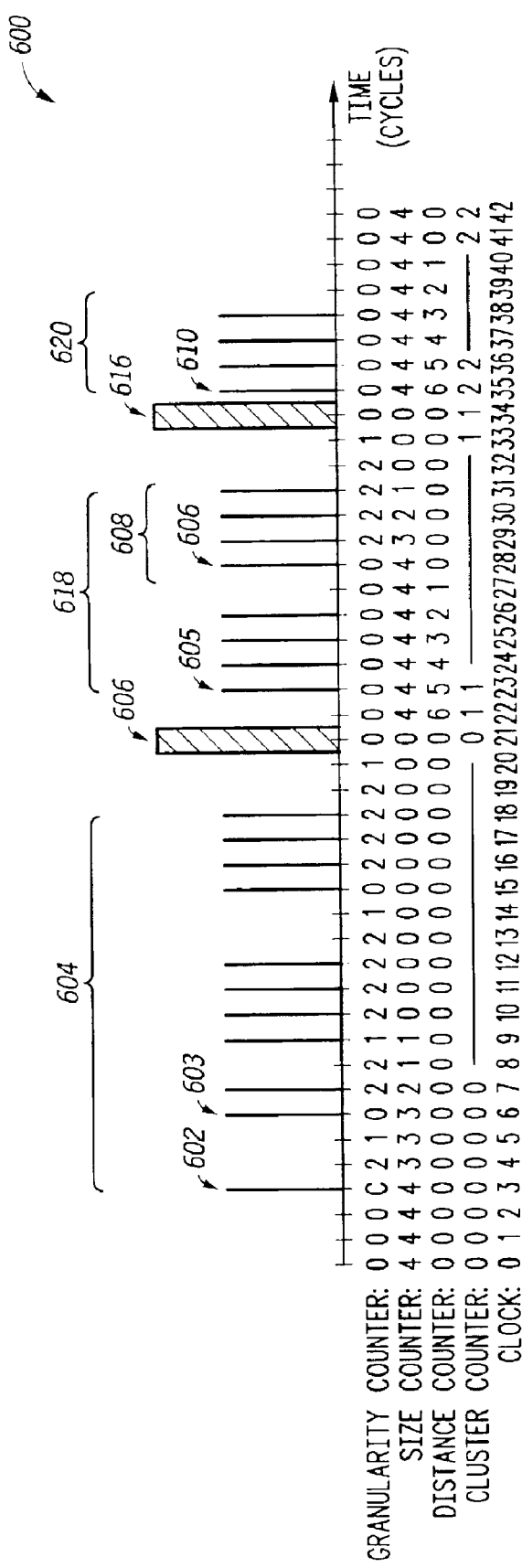
FIG. 6 illustrates another example of event clustering in accordance with one embodiment of the present invention.

FIG. 6 illustrates a clustering example 600 to better help in understanding the methods of FIGS. 4 and 5. The example of FIG. 6 is illustrated as a series of clocks (numbered 0–42) with the values of the granularity counter, size counter, distance counter, and cluster counter given at each clock. At clock 0, all values are initialized. The granularity counter, distance counter, and cluster counter are all set to zero, and the size counter is set to c_size, where, in the illustrated example, c_distance is 6 clock cycles, c_size is 4 events, and c_granularity is 2 clock cycles. For the first few cycles, until clock cycle 3, all the values are maintained (corresponding to the loop of decision diamond 408 of FIG. 4). (Also note that the distance counter was initialized to zero at clock zero thus bypassing the loop of decision diamond 406 and block 414 of FIG. 4.) A first event 602 is detected at clock 3 (corresponding to decision diamond 408). Therefore, the granularity counter is initialized to c_granularity and the size counter is decremented (corresponding to block 410 of FIG. 4). Note that the new values of the granularity and size counters in example 600 take effect at the next clock after first event 602; therefore, at clock 4, granularity counter is initialized to 2 and size counter is at 3. At this next clock (clock 4), no event is detected, so the granularity counter is again decremented at each clock (corresponding to decision diamond 412, decision diamond 422, and block 416 of FIG. 4). At clock 5, note that the granularity counter has not expired, therefore it gets decremented again (block 416). The decremented value appears at the next clock (clock 6).

At clock 6, though, an event 603 is detected (corresponding to flow proceeding from decision diamond 412 to block 420). Since an event 603 was detected, and the distance between events 602 and 603 was at most 2 clock cycles (i.e. c_granularity clock cycles), event 603 can be considered in the same cluster as event 602. Since event 603 is detected, the granularity counter is reinitialized to c_granularity and the size counter is decremented (corresponding to block 420 of FIG. 4). Therefore, at the next clock (clock 7), these new values appear. That is, at clock 7, the size counter is 2 and the granularity counter is again 2. Since this is the first cluster being detected, the distance counter remains at zero until it is reset after the detection of a first qualified cluster. This ensures that the first qualified cluster is always counted.

At clock 9, a fourth event is detected. The size counter is again decremented and the granularity counter is again reinitialized to c_granularity. At the next clock (clock 10), it can be seen that the size counter has expired (is equal to zero) thus indicating that a qualified cluster 604 is detected.

As can be seen in FIG. 6, the first four events of qualified cluster 604 meet the size threshold and granularity threshold since the time between any two adjacent events is at most 2 clock cycles. Since the distance counter is also expired (since this is the first detected qualified cluster), qualified cluster 604 will get counted; however, it will not get counted until the end of qualified cluster 604 is detected. Therefore, flow proceeds through decision diamonds 440 and 444 and blocks 442 and 446 until the end of the current qualified cluster is detected. At clock 21, the granularity counter has expired thus indicating the end of the current qualified cluster, as indicated by a striped bar 606 in FIG. 6. At this point, note that the granularity counter, size counter, and distance counter are all expired (i.e. equal to zero). Also, at this point, the distance counter is reinitialized to c_distance, the size counter is reinitialized to c_size, and the cluster counter is incremented (corresponding to block 448) as can be seen in FIG. 6 at clock 22 (since the values take effect at the next clock). The search for a new qualified cluster then commences (corresponding to point A of FIG. 4).

At clock 23, although an event 605 occurs, it is not detected as the first event because the distance counter has not yet expired. In the illustrated embodiment, no events are detected as the first event until the distance counter expires (corresponding to the loop of decision diamond 406 and block 414 of FIG. 4). A first event is therefore not detected (by decision diamond 408) until event 606 at clock 28. Note that although event 606 occurs during a cluster of events starting with event 605, it is still detected as a first event because performance monitor 104 waits until the distance counter has expired before searching for a next qualified cluster. Also note that the size counter was not decremented and the granularity counter is not set until after the distance counter expires.

Therefore, at clock 28, a new first event 606 is detected. Flow proceeds as described above through decision diamond 412 until the size counter expires, which occurs at clock 32. At this point, another qualified cluster 608 is detected, and flow proceeds to point C of FIG. 5, where the end of the qualified cluster 608 is detected (corresponding to decision diamonds 440 and 444 and blocks 442 and 446). Therefore, at clock 34, when the size, granularity, and distance counters are all expired and no event occurs, the end of the qualified cluster 608 is detected, as indicated by a striped bar 616 in FIG. 6. Also, at this point, the distance counter is reinitialized to c_distance, the size counter is reinitialized to c_size, and the cluster counter is incremented (corresponding to block 448) as can be seen in FIG. 6 at clock 35 (since the values take effect at the next clock). The search for a new qualified cluster then commences (corresponding to point A of FIG. 4).

A new first event is not detected until after the expiration of c_distance. Therefore, none of the four events starting with event 610 after striped bar 616 is detected as a new first event. The distance counter will continue to decrement, and the size counter and granularity counters will maintain their values. However, a next event (not shown) occurring at clock 41 or later will be considered a new first event and flow will then proceed as described above.

In the example of FIG. 6, two qualified clusters were counted: qualified cluster 604 and qualified cluster 608. Therefore, through the use of a distance threshold time (c_distance) in addition to a size threshold (c_size) and granularity threshold (_granularity), only two qualified cluster were counted from the series of events in example 600. As can be seen in FIG. 6, the cluster counter is incremented each time the size counter, granularity counter, and distance counter all equal zero and no event is occurring (which occurs at clocks 21 and 34). Therefore, through the use of the various thresholds which a user may set as desired, the number of qualified clusters that are counted varies, depending on the distribution the user wishes to profile. Also, it can be appreciated that the use of an additional distance threshold time allows for improved profiling in order to obtain a better characterization of a data processing system's performance.

Note that in the illustrated embodiments, the detection of a subsequent qualified cluster was not commenced until after the expiration of the distance counter. That is, a qualified cluster was searched for only after the expiration of the distance threshold time. However, in an alternate method, qualified clusters can be detected during the time in which the distance counter is decrementing. That is, rather than ignoring events occurring while waiting for the distance counter to expire, they can be detected as the "first event detected" of decision diamond 408. However, in this alternate method, upon detecting a qualified cluster, a determination needs to be made if it occurred at least a distance threshold time away from a previous qualified cluster in order to be counted by the cluster counter. That is, all qualified clusters determined using this alternate method may not be counted by the cluster counter. In one embodiment using this alternate method, qualified clusters are counted if at least a distance threshold time has occurred since a previous counted qualified cluster. In an alternate embodiment using this alternate method, qualified clusters are counted if at least a distance threshold time has occurred since a previous qualified cluster, regardless of whether or not it was counted by the cluster counter. Therefore, one of ordinary skill in the art can appreciate that there are many different ways to use the various thresholds described herein (i.e. size threshold, granularity threshold, and distance threshold time) to profile a data processing system's performance as desired.

For example, using the method described in the previous paragraph for the example 600 of FIG. 6, where only those qualified clusters which occur at least a distance threshold time after a previous qualified cluster, regardless of whether it was counted or not, would result in a different profiling result. Referring back to FIG. 6, using this alternate method, three qualified clusters would be detected: qualified cluster 604, qualified cluster 618, and qualified cluster 620. Each of these clusters are detected as qualified clusters because they meet both the size and granularity thresholds. Also, each of these clusters are considered separate qualified clusters because the distance between the end of each previous cluster and the beginning of the subsequent clusters are greater than the granularity threshold and therefore cannot be considered part of the same qualified cluster. For example, the time between clock 18 (the last event of qualified cluster 604) and clock 23 (the beginning of qualified cluster 618) is greater than 2 clock cycles. However, of these three detected qualified clusters, only one of the qualified clusters (qualified cluster 604) is counted. Qualified cluster 618 is not counted because the distance between qualified cluster 604 and 618 does not meet the distance time threshold. Similarly, qualified cluster 620 is not counted because the distance between qualified cluster 618 (the previous qualified cluster, even though it was not counted) and qualified cluster 620 does not meet the distance time threshold. (Note that in this embodiment of the alternate method, the distance counter is reinitialized to c_distance after detecting the end of each qualified cluster, regardless of whether it is counted or not.) Therefore, as compared to the method of FIGS. 4 and 5, this alternate method detects different qualified clusters and may only count a subset of these detected qualified clusters. The method of FIGS. 4 and 5 only detects those qualified clusters which will actually be counted since the method of FIGS. 4 and 5 always waits for the distance counter to expire before detecting a next qualified cluster. Also, this embodiment of the alternate method detects qualified cluster 618 while the method of FIGS. 4 and 5 only detects a portion of qualified cluster 618 (i.e. qualified cluster 608) since the method of FIGS. 4 and 5 allows for a first event to occur in the middle of a qualified cluster.

In yet another example using the alternate method where all qualified clusters are detected but only counted if at least a distance threshold time has occurred since a previous counted qualified cluster, a different profiling result may result. For example, referring again to FIG. 6, the same three qualified clusters would be detected: qualified cluster 604, qualified cluster 618, and qualified cluster 620. However, in this example, two of the qualified clusters are counted: qualified cluster 604 and qualified cluster 620. Two qualified clusters are counted because the determination of whether each qualified cluster meets the distance threshold time is determined differently. For example, as with the alternate method described in the previous two paragraphs, qualified cluster 604 is counted because it is the first detected qualified cluster. Also, to determine whether qualified cluster 618 is counted, it is determined whether the cluster distance between counted qualified cluster 604 and detected qualified cluster 618 meets the distance threshold time. In the example of FIG. 6, though, it does not and therefore is not counted. However, unlike the alternate method described in the previous two paragraphs, to determine whether qualified cluster 620 is counted, it is determined whether the cluster distance between the detected qualified cluster 620 and the counted qualified cluster 604 meets the distance threshold time. Since it does in the example of FIG. 6, it also is a counted qualified cluster. This differs from the previous embodiment of the alternate method described in the previous two paragraphs because the previous embodiment uses the cluster distance between qualified cluster 618, even though it was not counted, and detected qualified cluster 620. (Note that in this alternate embodiment of the alternate method, the distance counter is not reinitialized to c_distance after detecting the end of a qualified cluster that is not counted. Instead, it is only reinitialized to c_distance after detecting the end of a counted qualified cluster.)

Note that one of ordinary skill in the art can modify the flows of FIGS. 4 and 5 to accommodate these alternate methods of using the distance counter and counting qualified clusters. Also, one of ordinary skill in the art can appreciate how, through various uses of a distance threshold time, the number of qualified clusters that are counted can vary, depending on the distribution one wishes to profile. Therefore, it can be appreciated that the use of an additional distance threshold time allows for increased flexibility in obtaining an improved characterization of a data processing system's performance.

In the foregoing specification, the invention has been described with reference to specific embodiments. However, one of ordinary skill in the art appreciates that various modifications and changes can be made without departing from the scope of the present invention as set forth in the claims below. For example, the methods described herein can be implemented in software, hardware, firmware, or any combination thereof. For example, the methods or portions of the methods taught herein may be embodied as software on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may include different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A performance monitor comprising:
   an input operative to receive an indication of an event;
   control logic coupled to the input, the control logic operative to determine the occurrence of a qualified cluster of an event meeting a size threshold and a granularity threshold;
   a counter coupled to the control logic, the counter indicating a number of qualified clusters of the event with each subsequent qualified cluster indicated by the counter occurring at least a distance threshold time after a previously qualified cluster indicated by the counter.

2. The performance monitor of claim 1 wherein the counter dictates a number of qualified clusters of the event with each subsequent qualified cluster indicated by the counter occurring at least the distance threshold time after a previously qualified cluster.

3. The performance monitor of claim 1 further comprising:
   at least one counter control register for receiving a programmed of the distance threshold time.

4. The performance monitor of claim 1 wherein the control logic includes a second counter, the second counter being initialized with a value indicative of the distance threshold time and decremented to zero to indicate the passage of the distance threshold.

5. The performance monitor of claim 1 further comprising:
   a distance counter, the contents of the distance counter ranging from a value indicative of the distance threshold time to zero;
   a size counter, the contents of the size counter ranging from a value indicative of the size threshold to zero;
   a granularity counter, the contents of the granularity counter ranging from a value indicative of the granularity threshold to zero;
   wherein after the first incrementation of the counter, the counter is incremented when the contents of the distance counter, the size counter, and the granularity counter are zero and no event is occurring as indicated via the input.

6. The performance monitor of claim 1 further comprising:
   a distance counter, the contents of the distance counter ranging from a value indicative of the distance threshold time to zero;

a size counter, the contents of the size counter ranging from a value indicative of the size threshold to zero;

a granularity counter, the contents of the granularity counter ranging from a value indicative of the granularity threshold to zero;

wherein after the first incrementation of the counter, the size counter and the granularity counter are not decremented until the distance counter has been decremented to zero.

7. The performance monitor of claim 1 further comprising:

a control register including a portion indicating an event type of the clusters to be counted by the cluster counter.

8. A data processing system comprising:

a processor;

a monitoring unit including:
an input operative to receive an indication of an event;
control logic coupled to the input, the control logic operative to determine the occurrence of a qualified cluster of an event meeting a size threshold and a granularity threshold;
a counter coupled to the control logic, the counter indicating a number of qualified clusters of the event with each subsequent qualified cluster indicated by the counter occurring at least a distance threshold time after a previously qualified cluster indicated by the counter.

9. The system of claim 8 further comprising:

a bus, wherein the event includes a transfer of data on the bus.

10. The system of claim 8 further comprising:

a peripheral device operably coupled to the processor, wherein the event includes a transfer of data between the peripheral device and the processor.

11. The system of claim 8 further comprising:

a memory operably coupled to the processor, wherein the event includes a transfer of data between the memory and the processor.

12. The system of claim 8 wherein the event includes a receipt of an Ethernet frame from an Ethernet network.

13. The system of claim 8 wherein the processor and performance monitor are integrated in an integrate circuit.

14. A method for providing a count of a number of clusters of an event of an electronic system comprising:

determining an occurrence of a first qualifying cluster of an event and incrementing a count, wherein the determining includes determining if a size threshold number of the event occurs within a granularity threshold time of each other;

incrementing the count if a second qualifying cluster is determined to after at least a distance threshold time from the occurrence of the first qualifying cluster.

15. The method of claim 14 wherein determining whether a second qualifying cluster occurs after at least the distance threshold time from the occurrence of the first qualifying cluster includes reading a distance counter initialized with a value indicating distance threshold time and decremented to zero.

16. The method of claim 15 wherein the distance counter is initialized after the incrementation of the count.

17. The method of claim 15 wherein the distance counter is initialized after the determination of the occurrence of a qualified cluster.

18. The method of claim 14 further comprising:

writing a value indicating the distance threshold time into a register to set the distance threshold time.

19. The method of claim 14 wherein determining whether a second qualifying cluster occurs after at least a distance threshold time from the occurrence of the first qualifying cluster includes reading a distance counter.

20. The method of claim 14 wherein determining an occurrence of a qualified cluster further includes:

determining that a size counter initialized with a value indicating a size threshold number has decremented to zero; and determining that a granularity counter initialized with a value indicating granularity threshold time has decremented to zero.

21. The method of claim 14 wherein determining whether a second qualifying cluster occurs after at least the distance threshold time from the occurrence of the first qualifying cluster further includes:

reading a distance counter initialized with a value indicating the distance threshold time and decremented to zero;

determining that a size counter initialized with a value indicating a size threshold number has decremented to zero;

determining that a granularity counter initialized with a value indicating a granularity threshold time has decremented to zero;

wherein the size counter and the granularity counter are not decremented until the distance counter has been decremented to zero.

22. The method of claim 14 wherein the event includes a bus transaction.

* * * * *

UNITED STATES PATENT AND TRADEMARK OFFICE
CERTIFICATE OF CORRECTION

PATENT NO. : 6,937,961 B2
DATED : August 30, 2005
INVENTOR(S) : Carlos J. Cabral et al.

It is certified that error appears in the above-identified patent and that said Letters Patent is hereby corrected as shown below:

<u>Column 12,</u>
Line 35, change "dictates" to -- indicates --.
Line 41, insert -- indication -- between "programmed" and "of".

Signed and Sealed this

Eighteenth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,937,961 B2 Page 1 of 1
APPLICATION NO. : 10/255427
DATED : August 30, 2005
INVENTOR(S) : Carlos J. Cabral It is certified that error appears in the above-identified patent and that said Letters Patent is hereby corrected as shown below:

In Column 13, Line 43, Claim No. 13:

Change "performance monitor are integrated in an integrate circuit." to --performance monitor are integrated in an integrated circuit.--

In Column 14, Line 2, Claim No. 14:

Change "determined to after at least a distance threshold time" to --determined to occur after at least a distance threshold time--

Signed and Sealed this

Seventh Day of October, 2008

JON W. DUDAS
*Director of the United States Patent and Trademark Office*